United States Patent
Holm et al.

(10) Patent No.: US 9,884,245 B2
(45) Date of Patent: Feb. 6, 2018

(54) SKI BINDING

(71) Applicant: ROTTEFELLA AS, Klokkarstua (NO)

(72) Inventors: Thomas Holm, Oslo (NO); Even Wøllo, Naersnes (NO); Øyvar Svendsen, Oslo (NO)

(73) Assignee: ROTTEFELLA AS, Klokkarstua (NO)

( * ) Notice: Subject to any disclaimer, the term of this patent is extended or adjusted under 35 U.S.C. 154(b) by 95 days.

(21) Appl. No.: 14/443,514

(22) PCT Filed: Nov. 19, 2013

(86) PCT No.: PCT/NO2013/050201
§ 371 (c)(1),
(2) Date: May 18, 2015

(87) PCT Pub. No.: WO2014/077700
PCT Pub. Date: May 22, 2014

(65) Prior Publication Data
US 2015/0328530 A1 Nov. 19, 2015

(30) Foreign Application Priority Data

Nov. 19, 2012 (NO) .................................. 20121369

(51) Int. Cl.
*A63C 9/20* (2012.01)
*B29C 45/00* (2006.01)
(Continued)

(52) U.S. Cl.
CPC ............ *A63C 9/20* (2013.01); *B29C 45/0081* (2013.01); *B29C 45/1676* (2013.01); *B29K 2995/007* (2013.01); *B29L 2031/5263* (2013.01)

(58) Field of Classification Search
None
See application file for complete search history.

(56) References Cited

U.S. PATENT DOCUMENTS 4,148,502 A * 4/1979 Staufer ................ A43B 5/0411
280/615
4,191,396 A * 3/1980 Biermann ................ A63C 9/20
280/615
(Continued)

FOREIGN PATENT DOCUMENTS

CN 101115535 A 1/2008
FR 2650192 A1 2/1991
(Continued)

OTHER PUBLICATIONS

Chinese Office Action and Search Report dated Apr. 29, 2016, corresponding to Chinese Application No. 201380060142.0, in English.
(Continued)

*Primary Examiner* — Katy M Ebner
(74) *Attorney, Agent, or Firm* — Harness, Dickey & Pierce, P.L.C.

(57) ABSTRACT

The present invention relates to a ski binding (1) for the different forms of cross-country skiing, comprising a forward housing part (2) that contains a fixed engagement part (3), a movable engagement part (4), an actuating element (5) for moving the movable engagement part (4) between a locking position and a released position, and at least one flexible element (6) for abutment and cushioning against the front part of a ski shoe. The invention is characterized in that the flexible element (6) is injection molded together with the housing part (2). The present invention also relates to a method.

28 Claims, 3 Drawing Sheets

(51) Int. Cl.
  *B29C 45/16* (2006.01)
  *B29L 31/52* (2006.01)

(56) References Cited

U.S. PATENT DOCUMENTS

| | | | | |
|---|---|---|---|---|
| 4,235,452 A * | 11/1980 | Linecker | ............... | A43B 5/0411 280/615 |
| 4,303,259 A * | 12/1981 | Riikonen | ............. | A43B 5/0411 280/615 |
| 4,365,821 A * | 12/1982 | Kreyenbuhl | ......... | A43B 5/0411 280/615 |
| 4,533,154 A * | 8/1985 | Bernard | ................... | A63C 9/20 280/615 |
| 4,553,771 A * | 11/1985 | Bernard | ................... | A63C 9/20 280/615 |
| 4,907,817 A * | 3/1990 | Schwarz | ................... | A63C 9/20 280/615 |
| 4,917,400 A | 4/1990 | Salomon et al. | | |
| 4,925,206 A * | 5/1990 | Graillat | .................... | A63C 9/20 280/607 |
| 5,087,065 A * | 2/1992 | Provence | ............. | A43B 5/0411 280/615 |
| 5,152,546 A | 10/1992 | Dunand et al. | | |
| 5,190,310 A * | 3/1993 | Hauglin | ................... | A63C 9/20 280/607 |
| 5,338,053 A | 8/1994 | Hauglin | | |
| 5,794,963 A * | 8/1998 | Girard | ...................... | A63C 9/20 280/615 |
| 5,944,337 A * | 8/1999 | Girard | ...................... | A63C 9/20 280/613 |
| 6,027,135 A * | 2/2000 | Hauglin | ................... | A63C 9/20 280/615 |
| 6,402,184 B1 * | 6/2002 | Hauglin | ................... | A63C 9/20 280/615 |
| 8,801,027 B2 | 8/2014 | Wollo et al. | | |
| 2004/0140647 A1 * | 7/2004 | Kogler | ...................... | A63C 9/20 280/623 |
| 2004/0173995 A1 * | 9/2004 | Dandurand | .............. | A63C 9/20 280/631 |
| 2004/0207177 A1 * | 10/2004 | Riedel | ...................... | A63C 9/02 280/611 |
| 2008/0272577 A1 * | 11/2008 | Kogler | ................ | A43B 5/0417 280/615 |
| 2010/0314854 A1 * | 12/2010 | Girard | ................... | A63C 9/003 280/607 |
| 2012/0126510 A1 * | 5/2012 | Yelovina | ............ | A63C 9/08571 280/613 |
| 2012/0187643 A1 * | 7/2012 | Wollo | ...................... | A63C 9/20 280/11.31 |
| 2014/0319803 A1 | 10/2014 | Wollo et al. | | |
| 2016/0220889 A1 * | 8/2016 | Holm | ...................... | A63C 9/20 |

FOREIGN PATENT DOCUMENTS

| | | |
|---|---|---|
| WO | WO-97/47367 A1 | 12/1997 |
| WO | 02/089931 A1 | 11/2002 |
| WO | WO-2011/006544 A1 | 1/2011 |

OTHER PUBLICATIONS

International Search Report, ISA/EP, Rijswijk, NL, dated Mar. 17, 2014.

International Preliminary Report on Patentability (Ch. II), IPEA/EP, Munich, dated Mar. 19, 2015.

\* cited by examiner

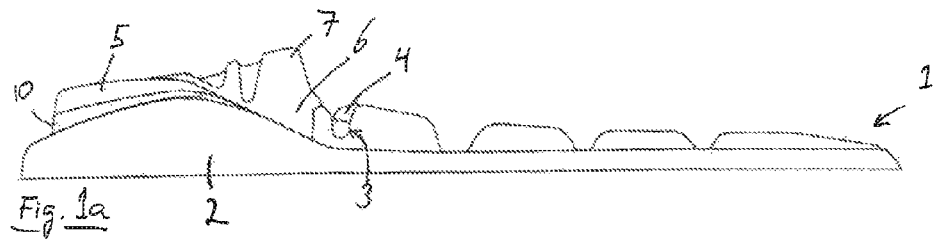
Fig. 1a
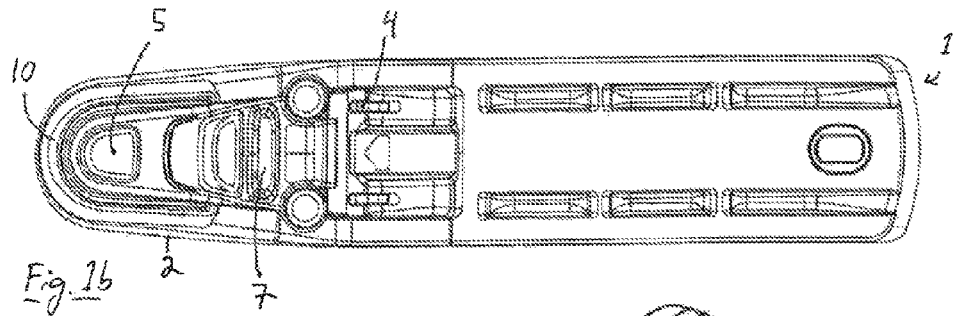
Fig. 1b
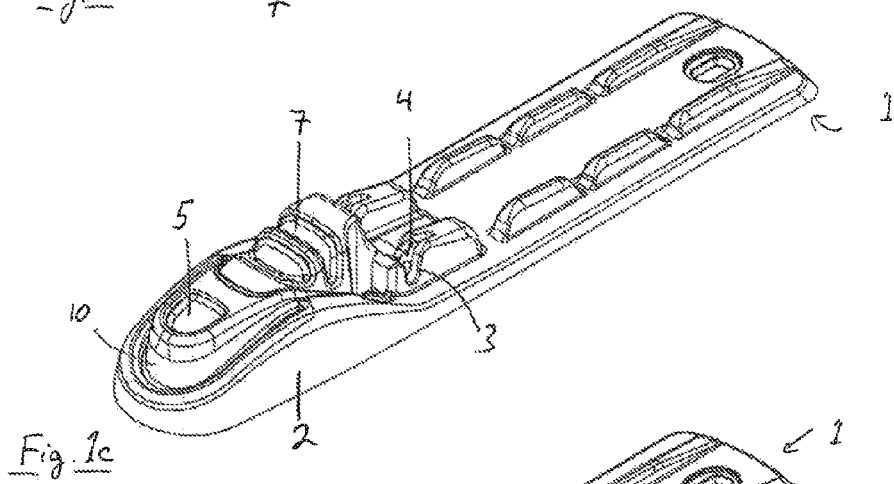
Fig. 1c
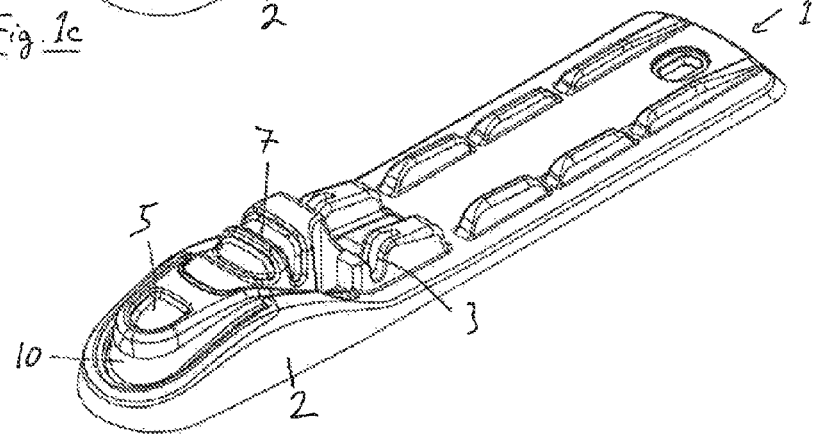
Fig. 1d
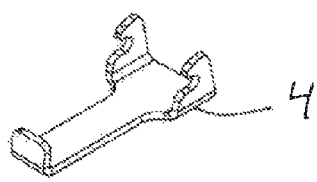

SKI BINDING

CROSS-REFERENCE TO RELATED APPLICATIONS

This application is a 371 U.S. National Stage of International Application No. PCT/NO2013/050201, filed Nov. 19, 2013, which claims the benefit of and priority to Norwegian Patent Application No. 20121369, filed Nov. 19, 2012. The disclosures of the above applications are incorporated herein by reference.

The present invention relates to a ski binding for the different forms of cross-country skiing and to a method for the manufacture thereof.

Modern ski bindings work well for the most part, but they have a complexity that affects several aspects of the binding, not least the price. A large number of parts that must be produced and assembled in the correct order means it is difficult to make significant cuts to material and production costs, which may ultimately make production in a high-cost country problematic. In addition, the complexity results in there being an increasing number of parts that may be worn and/or may break during use.

In order to reduce production costs and yet still be able to provide a high-quality binding at an acceptable retail price, it may be advantageous to allow most or the whole of the assembly of the ski binding parts to be carried out in a fully automatic process. The fewer manual operations that are necessary, the cheaper the binding.

A great number of ski bindings are available on today's market, and very many of them are based on the well-established NNN standard. Many of these ski bindings have a structure that requires a series of manual and/or complex automatic operations. In an automated assembly process, it is disadvantageous to allow operations to be carried out from different directions, i.e., some operations in a vertical direction, some in a horizontal direction and some even at an angle relative to these directions. The rotation of a structural part or element may also complicate or add complexity or costs to the necessary automated equipment.

It is therefore an object of the present invention to provide a ski binding which has structural parts or elements that are easy to assemble; which has a simple, yet reliable release mechanism with improved release element functionality; which provides an improved shoe fixing element; and which offers a simple method for assembling the parts.

It is also an object of the present invention to provide a simplified ski binding which comprises fewer parts, has lower manufacturing costs and which is suitable for mechanised manufacture.

These and other objects are provided by a ski binding according to independent claim 1. Further advantageous embodiments and features are disclosed in the dependent claims.

The following non-exhaustive list of references to the prior art is given to illustrate some of the disadvantages of the prior art that the present invention aims to resolve.

Each of U.S. Pat. No. 5,338,053, EP 1,848,516-B1 and WO 04/050197A1 is related to a ski binding which requires more structural parts than aimed at by, and will be provided through, the present invention, and which, moreover, requires the structural parts to be mounted from different directions.

In order to illustrate the prior art release mechanisms with release button, and a shoe fixing element, reference is made to EP 1,848,516-B1; U.S. Pat. No. 5,092,6; U.S. Pat. No. 6,957,827; U.S. Pat. No. 4,997,199; U.S. Pat. No. 4,915,405; U.S. Pat. No. 4,616,843; and U.S. Pat. No. 6,412,808. A further reference to the prior art related to a snowboard binding is U.S. Pat. No. 6,290,250. These references have either an element that transmits the force between the locking button and a locking slide, or an additional locking element that secures the shoe in the binding, such a locking element, in its turn, being actuated by the locking slide on actuation of the locking element.

U.S. Pat. No. 5,092,6; U.S. Pat. No. 6,957,827; U.S. Pat. No. 6,623,027; U.S. Pat. No. 4,616,843; and WO 04/050197-A1 relate to the aspect of a ski binding locking slide.

The invention will now be further described with the aid of exemplary embodiments. It will however be readily understood that the form and the structural design of one or more of the parts that are to be assembled may optionally be modified as far as appearance is concerned without affecting the function and assembly steps of the binding.

FIGS. 1a-d show an embodiment of a ski binding according to the present invention;

Figure 2:
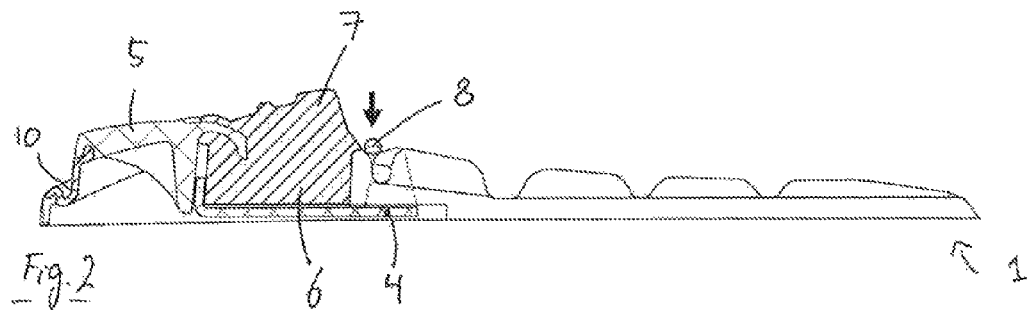
FIGS. 2-5 show the same embodiment as that shown in FIG. 1, the ski binding cut away in the longitudinal direction, and showing different steps of use.

According to the present invention, a new type of binding is provided which comprises a minimal number of parts and which can be manufactured in an extremely simple, quick and inexpensive manner.

The binding according to the present invention can be screwed onto a ski, glued onto a ski, mounted with the aid of a so-called NIS plate or other similar fixing plate, it can be molded straight onto or in the ski, together with the so-called CAP construction, or mounted in other ways.

FIGS. 1a-d show a ski binding 1 comprising a forward housing part 2, a fixed engagement part 3, a movable engagement part 4, an actuating element 5 for moving the movable engagement part 4 between a locking position and a released position, a flexible element 6 for biasing the movable engagement part 4 into a locking position, and a flexible element 7 for abutment and cushioning against the front part of a ski shoe. In the embodiment shown in FIG. 1, the movable engagement part 4 is constituted of a separate metal slide. All other parts of the binding 1 shown in FIG. 1 are injection molded together in one unit, so that the result is a new type of binding having a minimal number of parts that can be manufactured in a very easy, quick and inexpensive manner.

In the most straightforward embodiment of the invention, the binding can be produced in a minimal number of injection molding operations in a single mold, the different parts disclosed in the claims being injection molded one by one, without injection-molded blanks and intermediate products having to be moved from one manufacturing station to the next, or from one injection molding mold to another. This means that all parts of the binding consist of materials that can be injection molded, the materials of which the parts are injection molded either being compatible in such a way that different parts are firmly joined together where this is desirable, or have or maintain a particular movement function.

According to this simplest embodiment, even the movable engagement part 4, sometimes termed a locking slide, a part that is conventionally made of a metal material, could be made of an injection-molded material in an injection molding process. Such an injection-molded locking slide will be sufficiently wear-resistant for bindings that are to have simple functionality, such as hire equipment, demonstration equipment, spare equipment or the like. It is also conceivable that materials may be used in the injection molding process of the locking slide that have at least equally good properties as a metal material. The injection-molded locking slide must be configured and arranged such that it has sufficient possibility and ability to move in the binding, and that it is capable of holding a ski shoe firmly in place, whilst it releases the ski shoe on actuation of an actuating element which moves the movable locking slide between a locking position and a released position. According to the present invention, an actuating element for moving the movable engagement part between a locking position and a released position involves that the movable engagement part is not only movable from a locking position to a releasing position, but that the opposite is also a possibility.

In this description reference is made to a ski shoe. A ski shoe is not shown in the figures in its entirety, but a so-called sole pin is shown and indicated by the reference numeral 8.

According to another embodiment of the invention, a housing part 2 can first be injection molded in a suitable injection molding mold, and an actuating element 5, for moving the movable engagement part 4 between a locking position and a released position, is injection molded in a suitable second injection molding mold, whereupon the housing part 2 and the actuating element 5 are transferred to a third injection molding mold in which a flexible element 6 for biasing the movable engagement part 4 towards a locking position and a flexor 7 for abutment and cushioning against the front part of a ski shoe are injection molded in the third injection molding mold in such a way that the housing part, the actuating element, the flexible element and the flexor form an assembled unit. Lastly, a movable engagement part 4, a locking slide of metal, which has been made separately, is inserted into said assembled unit, the result being a complete binding 1 that is ready for mounting and use on a ski. The injection molding material forming the flexible element 6 and the flexor 7 may, for example, consist of a suitable elastomeric material that has the desired hardness and resilient/elastic properties. At the same time, the elastomeric material and the injection molding material for the housing part and the actuating part should be compatible in such a way that they adhere well to one another and work well together in a wide temperature range. The elastomeric material and the injection molding material should also retain their properties over time, such that they maintain their properties during storage and periods of non-use.

Within the scope and idea of the invention, it is understood that there may be wide latitude as to how a production line is organised, how many injection molding molds are used, whether, for example, the housing part 2, the actuating element 5 and/or the locking slide 4 comprise several separate parts (for example, of different colour, hardness/materials choice etc.), whether the flexible element 6 and the flexor 7 are constituted of separate injection-molded parts (optionally of different hardness and/or other properties).

An example of an alternative construction is that the housing part and the actuating element 5 are molded as one part, and that the actuating element 5 constitutes a button forms a live hinge 9 connected to the housing part 2. FIGS. 1-5 shows such a live hinge 9 that is connected to the housing part 2 to the rear of the actuating element 5. FIG. 5 shows where and how the live hinge 9 can be bent whilst the actuating element 5 maintains its intended actuating element or button function.

Figure 7:
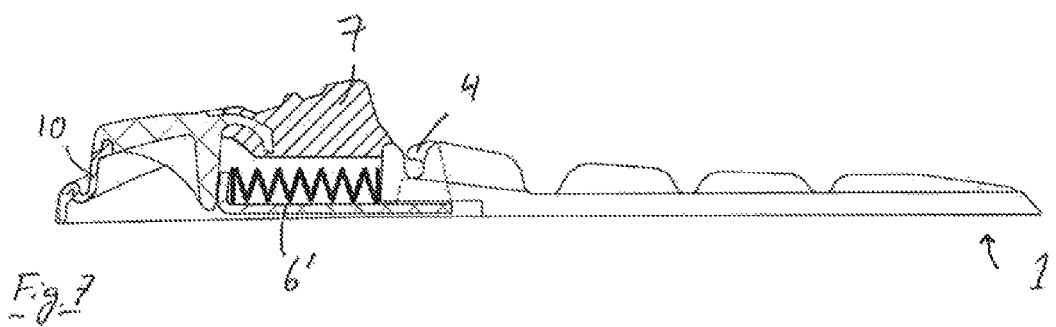
FIG. 7 shows another alternative embodiment of the present invention.

Another alternative structure, ref. FIG. 7, is that the flexible element is formed of separate spring element 6' (for example, a spiral spring, leaf spring, separate element of an elastomeric material), and that the flexor 7 is injection molded in, to and/or together with the housing part 2 and optionally a button/actuating element 5. In this embodiment, the finished binding might comprise three separate parts: an integral unit comprising housing part 2, flexor 7 and button 5, a locking slide 4 of metal and a flexible element comprising a spiral spring 6'. An alternative embodiment of this specific example may, in its turn, be that the flexible element 6', then, for example, in the form of a leaf spring, is punched out of a metal blank that is also to form the locking slide 4.

As mentioned, the binding 1 may, for example, comprise several separate injection-molded parts, which are then later connected by an elastomeric material, the different housing parts having different properties, such as hardness, colour, surface structure etc., but it is also possible to manufacture a housing part 2 in one or more parts such that different injection molding materials having different properties can be simultaneously injection molded into the injection molding mold such that the housing part 2 has different zones or portions of different properties even though the housing part 2 per se only comprises one part that is injection molded in one and the same process. An example of the last-mentioned may be that a button 5 in the form of a live hinge 9 is injection molded in the same operation as the rest of the housing part 2, but using an injection molding material that has a different colour and/or hardness than the rest of the housing part 2. In the same way, an injection-molded locking slide 4 can be formed together with the rest of the housing part 2, the injection molding material that forms the main part of the locking slide 4 being harder/more ductile/more rigid than the rest of the housing part. In the last-mentioned example, the junction between the housing part body and the simultaneously injection-molded locking slide also forms a live hinge, or optionally a weakness zone that easily breaks in a subsequent process stage or when the binding is used for the first time.

In the above, the term "live hinge" is used to describe a flexible region in a single continuous blank or part, where the flexible region has a hinge function, but at the same time does not involve a mechanical hinge comprising several parts etc.

Figure 6:
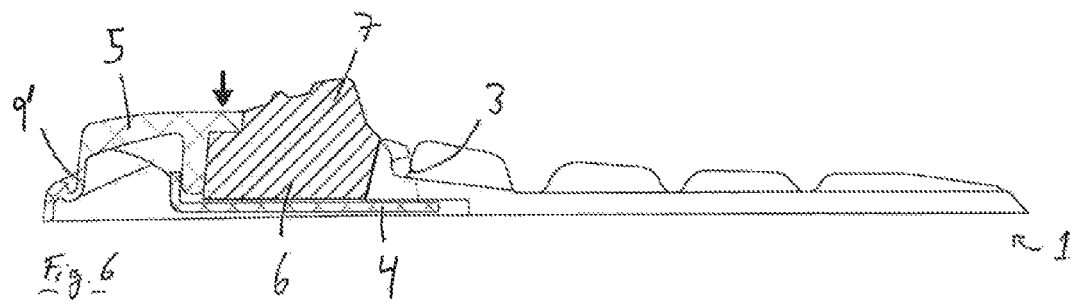
FIG. 6 shows an alternative embodiment of the present invention.

FIG. 6 basically shows another embodiment comprising a live hinge 9', but here the live hinge is forward of the button or actuating element 5, the engagement part 4 facing the other way (backwards instead of forwards) and the actuating element or the button 5 having to be depressed at its rear edge in order to release the ski shoe. In other respects, the underlying concept shown in FIG. 6 is the same as that shown in the other figures and explained in connection with alternative embodiments in this description. In this connection, it is important to stress that the different design features and the choices that can be seen when reading and comprehending this description are meant to be combined across examples/embodiments, as, for instance, the embodiment shown in FIG. 6 is combined with FIG. 7, so as to result in an embodiment with a live hinge forward of the button 5, an engagement part 4 that opens backwards, but with a spring element 6' instead of a combined flexor 7 and flexible element 6 of an elastomeric material.

Figure 3:
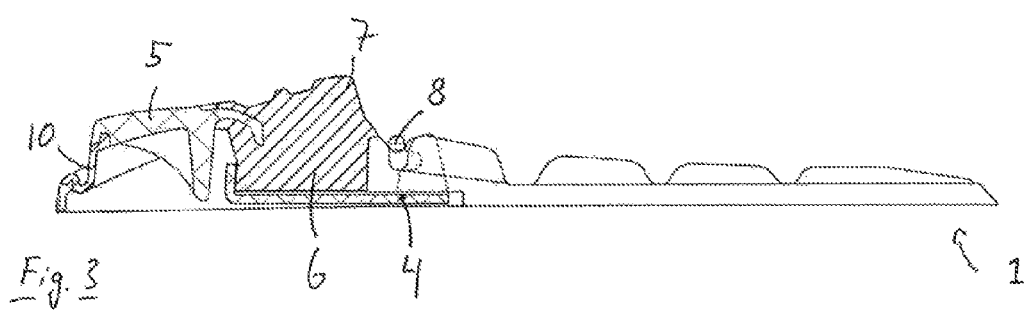
Figure 4:
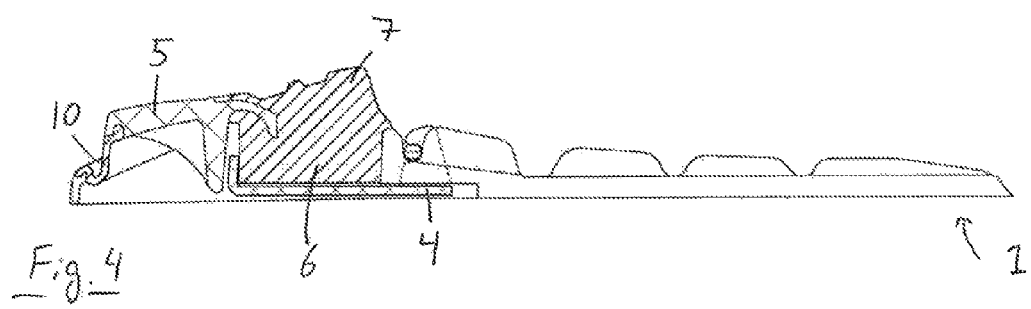
Figure 5:
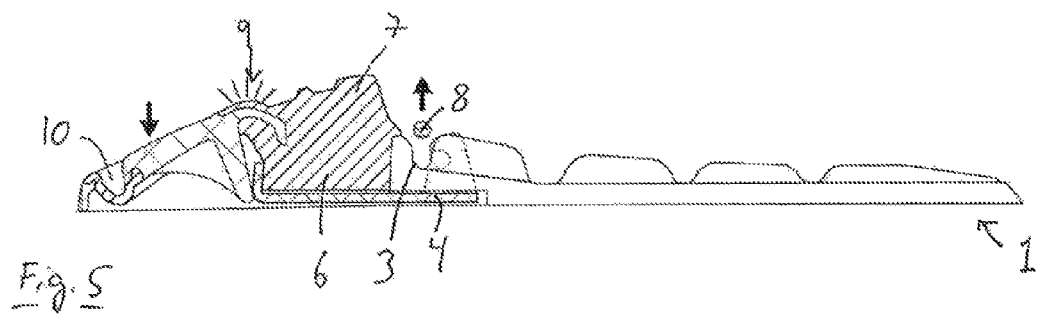

FIGS. 2 to 5 form a sequence of operational or user steps which might be relevant during the use of an actual ski binding corresponding to the binding which these figures attempt to illustrate. In FIG. 2 it can be seen how the sole pin 8, and thus the ski shoe, can be fastened to the binding 1 by pressing the sole pin 8 into the fixed engagement part 3, the movable engagement part 4 opening or moving backwards sufficiently far to allow the sole pin 8 to slip into the fixed engagement part 3. This is shown in FIG. 3. It can also be seen in FIG. 3 how a flexible element 6 for biasing the movable engagement part 4 is slightly compressed compared to that shown in, for example, FIGS. 2 and 4. The force stored in the flexible element 6 during this compression causes the engagement part 4 to slip across and lock the sole pin in place, ref. FIG. 4. To release the sole pin 8, and thus the ski shoe, the biasing force from the flexible element 6 must be overcome, which is achieved by depressing the button or actuating element 5, ref. FIG. 5. This situation is illustrated by an arrow that is intended to symbolise the force used to depress or activate the button 5, the arrow above the sole pin 8 being intended to symbolise that the sole pin 8, and thus the ski shoe, is released.

According to the embodiment shown in FIGS. 2-5, a so-called step-in binding is provided, i.e., a system where it is easy to put the skis on simply by stepping the ski shoes/sole pin down into the bindings, without having to bend down and manipulate a lever, over-centre mechanism, a button or the like. The release of the bindings/skis can be easily effected by using the ski poles, the user thus not needing to bend down either to put his skis on or to take them off. At the same time, it is important that the skis can easily be taken off in the event of, for example, a fall in loose snow or in wooded undergrowth, situations that require the user to be able, by means of plain manual power, to reach the bindings and release them.

A closer study of FIG. 5 will also clearly show that the button 5 is illustrated as depressed and the flexible region 9 is under the tension of bending forces. It will also be seen that the flexible element 6 is compressed and thus ready to pull the engagement part 4 forwards and push the button 5 up into its stationary, unloaded position.

FIG. 5 also shows a bellows element 10 that is slightly deformed compared with what is shown in the other FIGS. 1-5 and 7. This bellows element can, according to one embodiment, be formed in one piece with the flexible element 6 and the flexor 7, since the bellows element 10, the flexible element 6, the flexor 7 and any other elements of the binding, for example, a logo, a friction zone or part or the like, can be formed in one single, or optionally two or three etc., separate injection molding process(es). The bellows element 10 will form a highly expedient and functional seal that will be able to contribute to keeping snow and ice particles out, thereby avoiding so-called snow packing. In the embodiment shown in FIG. 6, where the live hinge is shown arranged forward of the button 5, the bellows element can obviously be arranged to the rear and/or to the side of the button 5, and any other moving parts that it is desired to protect against snow packing, obtain a particular appearance or style etc.

Figure 8:
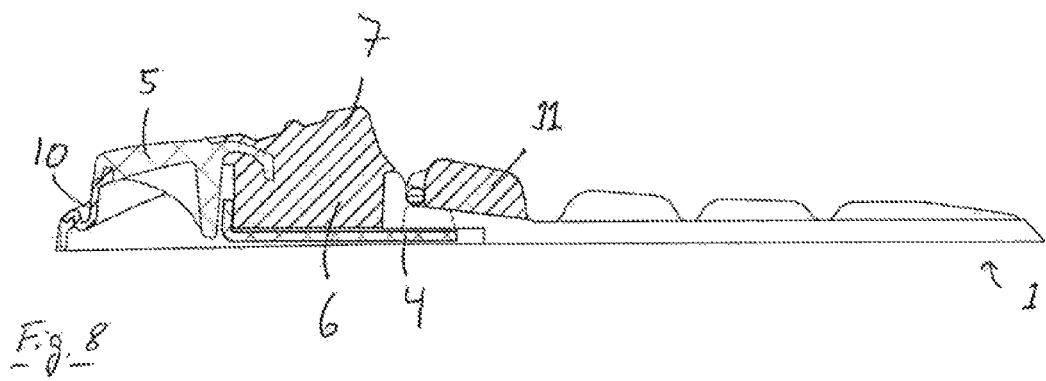
FIG. 8 shows yet another alternative embodiment of the present invention.

FIG. 8 shows an embodiment of the present invention that is particularly suitable for the style that is known as "skate". This embodiment is provided with a so-called rear flexor 11, the task of which is to stabilise the ski shoe when the ski is not in contact with the snow surface.

It will thus be understood that the bellows element 10, the flexible element 6, the flexor 7 and any other elements in the binding, for example, a logo, a friction zone or part, or the like and the rear flexor 11 can be made in one single, or optionally two or three etc., separate injection molding process(es). Again, it is the case that one or more of the elements, for example, the bellow element 10, the flexible element 6, logo, an optional friction zone or part etc. can be omitted altogether or replaced by other elements. A specific example is to replace the flexible element 6 of an elastomeric material with a spring element 6', for example, a spiral spring or leaf spring.

In this description a distinction is made between the terms "the flexible element" and "the flexor". It will understood that these two elements according to some of the embodiments may constitute the same part, that is to say, one part having two different functions. Examples are also given of embodiments in which the flexible element only has a flexor function, and that the function of moving the movable engagement part 4 between a locking position and a released position is performed by a spiral spring, leaf spring 6' or the like. It is also conceivable that the two functions are performed by their respective flexible element, two separate parts having the same or different hardness or the like being formed. In the following claims, the wording "the flexible element" is used first and foremost, it being understood that it may have properties for moving the movable engagement part 4 between a locking position and a released position, and/or have flexor properties, and/or is formed of a spiral spring, leaf spring 6' or the like. As regards the flexible element 6 for biasing the movable engagement part 4 towards a locking position, that is a function that is strictly speaking not necessary and thus is "nice to have", but not "need to have". In the embodiments disclosed in this document, this flexible element 6 is primarily related to a so-called "step-in" functionality as described in more detail above.

It will be understood that a substantial number of the advantages provided by the present invention will be obtained by providing or making a ski binding 1 that comprises a forward housing part 2 having a fixed engagement part 3, a movable engagement part 4, an actuating element 5 for moving the movable engagement part 4 between a locking position and a released position, at least one flexible element 6, 6', 7, where the actuating element 5 for moving the movable engagement part 4 comprises a flexible region, where the flexible element 6 and the movable part 4 are manufactured separately, the housing part 2, the flexible element 6, 6', 7 and the movable engagement part 4 are assembled into a wholly or partially assembled ski binding 1 in a separate, final manufacturing step.

The invention claimed is:

1. A ski binding for cross-country skiing comprising a forward housing part containing:
    a fixed engagement part;
    a movable engagement part;
    an actuating element for moving the movable engagement part between a locking position and a released position;
    at least one flexible element configured for abutment and cushioning against the front part of a ski shoe,
    wherein the fixed engagement part, the actuating element, and the flexible element are injection molded together as an integral unit.

2. The ski binding according to claim 1, wherein the flexible element also comprises a flexible element for biasing the movable engagement part towards a locking or released position.

3. The ski binding according to claim 2, wherein the flexible element for abutment and cushioning against the front part of a ski shoe and for biasing the movable engagement part forms one and the same injection-molded part.

4. The ski binding according to claim 1, wherein the actuating element for moving the movable engagement part comprises a flexible region.

5. The ski binding according to claim 4, wherein the flexible region constitutes a live hinge.

6. The ski binding according to claim 5, wherein the live hinge is hinged to, joined to or attached to the housing part.

7. The ski binding according to claim 4, wherein the flexible region is hinged to, joined to or attached to the housing part.

8. The ski binding according to claim 1, wherein the actuating element for moving the movable engagement part between a locking position and a releasing position is an independent part.

9. The ski binding according to claim 8, wherein the independent part, which constitutes the actuating element for moving the movable engagement part between a locking position and a releasing position, is fastened to the housing part via the flexible element or with the aid of an injection-molded bellows.

10. The ski binding according to claim 9, wherein the actuating element is in engagement with or rests against a metal slide, such that the manipulation of the actuating element causes a movement of the metal slide.

11. The ski binding according to claim 1, comprising a spring element for biasing the movable engagement part.

12. The ski binding according to claim 1, wherein the movable engagement part comprises a metal slide that is biased by means of at least one flexible element and that is adapted to be moved from a biased, locking position to a released position, or vice versa, by manipulating the actuating element.

13. The ski binding according to claim 1, wherein the forward housing part, the fixed engagement part, a flexible element for biasing the movable engagement part towards a locking position, the flexible element for abutment and cushioning against the ski shoe, and the actuating element for moving the movable engagement part between a locking position and a released position, together form one comolded unit.

14. A method for manufacturing a ski binding for cross-country skiing, comprising the steps of:
providing a forward housing part;
providing a fixed engagement part;
providing a movable engagement part;
providing an actuating element for moving the movable engagement part between a locking position and a released position;
providing a flexible element configured for abutment and cushioning against the front part of a ski shoe,
wherein the forward housing part, the fixed engagement part, the actuating element, and the flexible element are injection molded together as an integral unit.

15. The method according to claim 14, wherein the flexible element also comprises a flexible element for biasing the movable engagement part towards a locking or released position.

16. The method according to claim 15, wherein the flexible element for abutment and cushioning against the front part of a ski shoe and for biasing the movable engagement part is made of one and the same injection-molded part.

17. The method according to claim 14, wherein the actuating element for moving the movable engagement part is provided with a flexible region.

18. The method according to claim 17, wherein the flexible region constitutes a live hinge.

19. The method according to claim 18, wherein the live hinge is hinged to, joined to or attached to the housing part.

20. The method according to claim 17, wherein the flexible region is hinged to, joined to or attached to the housing part.

21. The method according to claim 14, wherein the actuating element for moving the movable engagement part between a locking position and a releasing position is provided as an independent part.

22. The method according to claim 21, wherein the independent part, which constitutes the actuating element for moving the movable engagement part between a locking position and a releasing position, is fastened to the housing part via the flexible element or with the aid of an injection-molded bellows.

23. The method according to claim 14 comprising a spring element for biasing the movable engagement part.

24. The method according to claim 14, wherein the movable engagement part is provided by a metal slide that is biased with the aid of a flexible element and that is adapted to be moved from the biased, locking position to the released position, or vice versa, by manipulating the actuating element.

25. The method according to claim 22, wherein the actuating element is in engagement with or rests against the metal slide, such that the manipulation of the actuating element causes a movement of the metal slide.

26. The method according to claim 14, wherein the forward housing part, the fixed engagement part, a flexible element for biasing the movable engagement part towards a locking position, the flexible element for abutment and cushioning against the ski shoe, and the actuating element for moving the movable engagement part between a locking position and a released position, together form one comolded unit.

27. A method for manufacturing a ski binding for cross-country skiing, wherein it comprises:
providing, in a first injection molding step, a forward housing part comprising a fixed engagement part and an actuating element for moving a movable engagement part between a locking position and a released position, the actuating element being connected to and forming part of the forward housing part via a flexible region;
providing, in a separate step, a movable engagement part of a metal or a metal alloy;
providing, in a second injection molding step, a flexible element configured for abutment and cushioning against the front part of a ski shoe, and a flexible element for biasing the movable engagement part;
the two said injection molding steps using two different materials that have different hardness.

28. The method according to claim 27, wherein the finished ski binding forms a comolded unit in which the movable engagement part constitutes the only loose part.

* * * * *